Sept. 2, 1958 W. N. STICKEL 2,850,559
BATTERY SEPARATOR AND METHOD OF MAKING SAME
Filed Jan. 10, 1955
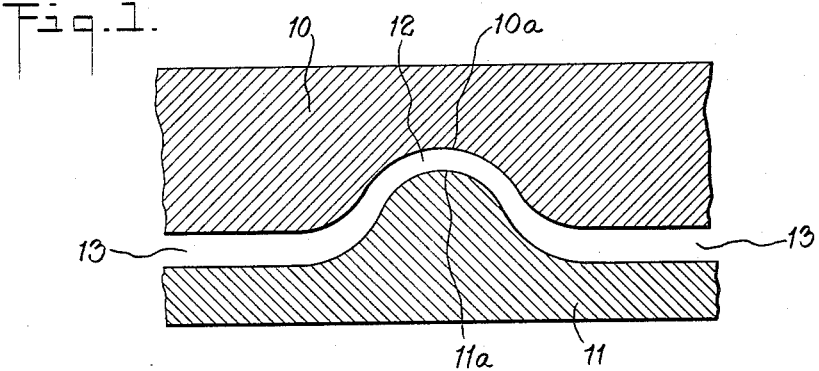
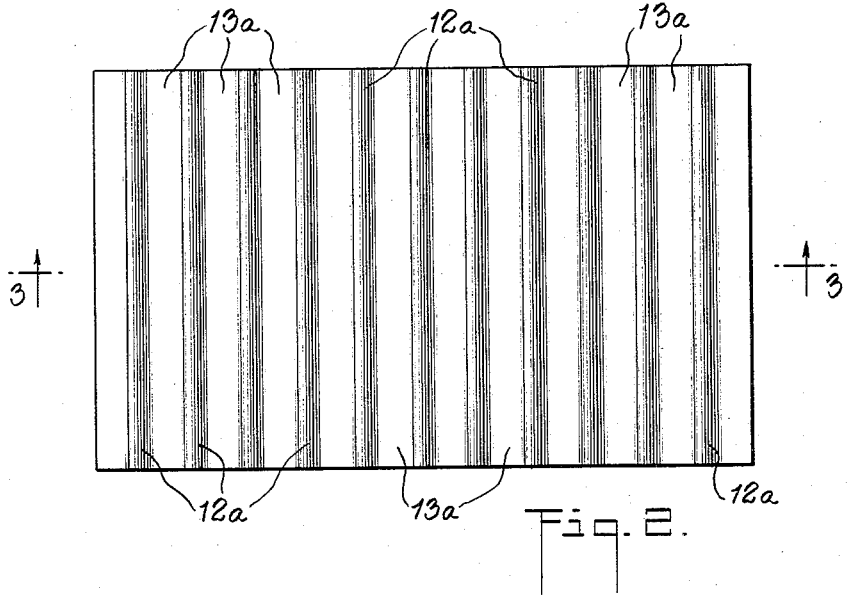
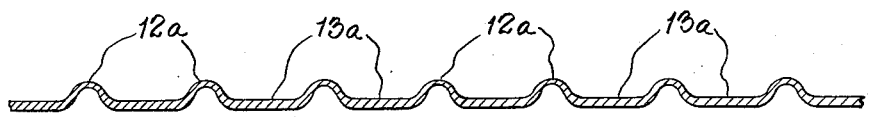
INVENTOR.
Wesley N. Stickel
BY
Davis Hoxie & Faithfull
ATTORNEYS

United States Patent Office 2,850,559
Patented Sept. 2, 1958

2,850,559

BATTERY SEPARATOR AND METHOD OF MAKING SAME

Wesley N. Stickel, Westfield, Mass., assignor to Texon, Inc., South Hadley Falls, Mass., a corporation of Massachusetts Application January 10, 1955, Serial No. 480,637

10 Claims. (Cl. 136—145)

This invention relates to separators which are inserted between the positive and negative plates of lead-acid storage batteries. It has particular reference to an improved battery separator and a method of making the same.

Lead-acid storage batteries, as commonly made, include separators placed between the positive and negative plates and serving to prevent short-circuiting by the excrescences or "trees" which accumulate on the positive plates and project toward the negative plates during charging of the battery. The separators also prevent, as far as possible, the dislodgment of the positive active material. These separators must be ionically permeable so that ionic flow may be maintained through the electrolyte and the separators. In fact, the greater the porosity of the separators, the higher the efficiency of the battery. Apparently, the life of the separators also increases with their porosity, at least in the case of separators made from extracted wood.

Battery separators of the type with which the present invention is concerned are made from cellulosic material. The cellulose fibers, which are preferably highly purified alpha-cellulose fibers, are usually formed into a mat or web and thoroughly impregnated with an acid resistant thermosetting resin binder, such as a phenol-formaldehyde resin, which is then heated to cure and set the resin, as disclosed in Patent No. 2,543,137 of Jay J. Uber, granted February 27, 1951. The resin is distributed over the interior and exterior surfaces of the fibers of the paper base material so as to protect the latter against attack by the battery liquid, although the resin does not materially lessen the air permeability of the original web of paper base material.

In the manufacture of battery separators of the above described type, the separator is provided with spaced elongated ribs protruding from at least one face of the separator to give it greater mechanical strength and ability to perform as a control insulator. A major problem in the production of such separators has been to provide the ribs with adequate abrasion resistance and resistance to chemical oxidation at the points where the rib surfaces contact the plates of the battery, and with no greater ohmic resistance through the ribs than at the other portions of the separator, in addition to the mechanical strength which these ribs must have.

The principal object of the present invention resides in the provision of a battery separator in which the ribs meet the above noted requirements more completely than has heretofore been the case, and a method of making such separators expeditiously at low cost.

According to the invention, a thin web of an air permeable paper base material is impregnated with an acid-resistant thermosetting resin, such as a phenol-formaldehyde resin, so that the web is thoroughly impregnated with the resin. The impregnated web is then formed at spaced elongated portions with ribs protruding from at least one face of the web, and some of the resin and fibers are displaced from the high portions of the ribs toward the base portions thereof under pressure to cause a flow of resin laterally of the ribs. The formed web is then heated to the curing temperature of the resin.

In the preferred practice of the invention, the formation of the ribs and the displacement of the resin laterally from the high portions of the ribs are effected simultaneously while the web is heated to a temperature below the setting temperature of the resin. When a phenol-formaldehyde is used as the resin, the forming and displacement steps are performed while the resin is at a temperature in the order of 50°–80° C. and in the B-stage, so that the resin will be sufficiently viscous to flow under the pressure applied in forming the ribs but will be advanced beyond the A-stage in which the resin exists when the web is saturated. The lateral displacement or flowing of the resin and fibers under pressure may be effected by coacting roller members or die members which provide a gradually increasing clearance between the coacting members from the high point of each rib toward the base portions of the rib, whereby these high points are subjected to greater pressure than the other parts of the web. Thus, some of the resin and fibers at the high portions of the ribs are in effect extruded laterally toward the base portions of the ribs while heated, and both the fibers and the remaining resin at the high portions of the ribs are more compacted than the other parts of the web and leave the high portions with a relatively small web thickness.

The resulting separator, as compared with conventional paper base separators provided with integral ribs, has a substantially greater resistance to abrasion and oxidation at the high portions of the ribs where they contact the battery plates. Also, the new separator has greater dimensional stability and, although the ribs are firm, the separator is flexible without being brittle. While the density of the ribs is increased at their high portions where the material acquires a minimum thickness, they will, nevertheless, readily transmit electrolyte solution; and the remaining areas of the separator are also unaffected as regards their permeability.

The resin-impregnated web of paper base material may be made as disclosed in said Uber Patent No. 2,543,137, and then dried as disclosed in said patent, prior to the forming operation. According to the preferred practice, however, the web is made from highly purified alpha-cellulose fibers which have first undergone a mechanical pretreatment similar to that used in hydrating stock in the paper making art, which minimize cutting of the fibers and allows them to stretch when the impregnated web is subsequently compressed in the rib-forming operation. The fibers thus treated are formed into a uniform continuous wet mat or web having a uniform porosity throughout its entire area. The wet web is then compressed so that both air and water are expelled from the openings or spaces within the fibers, as well as the spaces surrounding and between the fibers. The compressed web is then submerged in a high solids solution of resin in water, and the web and fibers are permitted to expand. The resin solution may be a solution of an A-stage phenol-formaldehyde resin in water, and I have found that the resin solution described in the above noted Uber patent is satisfactory. As the web and fibers expand or swell from their compressed condition, the resin solution is absorbed into and around the fibers. The saturated web is then subjected to pressure to expel the excess resin solution. The excess solution thus expelled is much lower in resin solids than the original saturating solution, which indicates that the water originally present in the compressed wet web and fibers is substantially displaced by resin. In this way, complete resin coverage of internal as well as external surfaces of the fibers is assured, thereby affording better protection of the fibers. The saturated web is then passed to a drying operation where the temperature and drying rate are controlled to provide proper drying with minimum losses and migration of resin. After the drying operation, the web has a volatile content of 12–15%. At this point, the web is still thermoplastic.

The rib-forming operation will now be described in connection with the accompanying drawing, in which:

Fig. 1 is a vertical sectional view of part of a die which may be used in the forming operation;

Fig. 2 is a plan view of a web in its final form, as it exists after the forming operation, and Fig. 3 is a sectional view on the line 3—3 in Fig. 2.

The rib forming device, as illustrated, comprises a pair of co-acting die members 10 and 11 made of metal and provided with heating means (not shown). The male member 11 of the die is provided with a series of elongated protrusions extending in parallel spaced relation across one face of the member, one of which is shown at 11a. The protrusions 11a are substantially wave-shaped in cross section, as shown in Fig. 1. The female member 10 of the die has elongated recesses 10a which mate with the protrusions 11a. However, the clearance between the surface of each recess 10a and the opposing surface of the mating protrusion 11a is non-uniform. More particularly, this clearance is at a minimum at the highest point of the protrusion 11a, as shown at 12, and gradually increases along the sides of the protrusion and toward the base thereof to a maximum clearance 13 at the flat portions of the opposed die members, that is, the flat surfaces lying between the protrusions 11a on the member 11 and between the recesses 10a in the member 10.

The resin-impregnated web is compressed over its entire area by means of the die members 10 and 11, as by forcing one these members against the web interposed between the two members. By reason of the protrusions 11a and the mating recesses 10a, the web is thus shaped between the die members along spaced elongated portions to form ribs protruding from one face of the web, as shown in Figs. 2 and 3. Due to the reduced clearance 12 at the high points of the protrusions 11a (for any given spacing of the die members), the web material undergoes a maximum compression at the high portions 12a of the ribs, the compression gradually decreasing along the sides of the ribs and being at a minimum at the flat portions 13a of the web lying between the ribs (the portions in the clearances 13). The relatively heavy pressure at the high portions of the ribs (the portions in the clearances 12) causes some of the thermoplastic resin to be displaced from these portions of the ribs toward the base portions thereof, that is, laterally of the ribs, so that the resin and fibers are made to flow laterally of the ribs under the heat and pressure of the die. This resin flow is accompanied by a flow or stretching of the fibers at the high portions of the ribs as the material is pressed in the die, thereby forming firm compressed rib structures. The flat portions 13a of the web will be compressed somewhat, although substantially less than the high portions 12a of the ribs.

The temperature of the die 10—11 is held between 50° and 80° C., depending upon the degree of advancement of the resin binder from its A-stage when the web is subjected to the die operation, this temperature being well below the setting temperature of the resin. The condition of the resin when the web is inserted between the die members, and the temperature to which the resin is heated by the die, are such that the resin is in its B-stage, which is characterized by long chain-like structures formed by the phenol-formaldehyde units, the resin being insoluble in water and alkali but solvent in solvents such as acetone and alcohol. In this B-stage, the resin is still thermoplastic, so that it can be molded or formed, but it will hold its pattern.

After the web has been subjected to the die operation, to compress the material and form the ribs, the web is removed from the die and is heated to cure and set the resin, so that the latter is in its infusible or C-stage. This setting of the resin may be accomplished by heating the web in a curing oven at a temperature of 160–190° C. for approximately two minutes.

As previously mentioned, the formation or embossing of the ribs 12a on the web is effected while the phenol-formaldehyde resin is in its B-stage. I have found that this condition is highly important to the proper fabrication of the finished separator. Due to the properties of the resin in its B-stage, the resin can flow readily at the high portions of the ribs and laterally along the sides thereof under the heat and pressure of the forming operation, to provide a maximum density of the material and a smaller web thickness throughout the high portions 12a of the ribs. On the other hand, the resin while in its B-stage is adapted to hold the web in the shape to which it was deformed by the die, so that the web will retain its desired shape through the final curing operation. I have also found that it is highly desirable to have a certain volatile content, namely, 12–15%, in the web after the initial drying and prior to the die operation. The mechanical pretreatment of the fibers as previously mentioned also improves the finished separator, since it allows the fibers to stretch under the maximum pressure at the high portions of the ribs.

The high portions 12a of the ribs of the finished separator have a substantially greater abrasion and oxidation resistance than is the case with separators of this type made in the conventional manner. Thus, at the critical points where the rib surfaces contact the battery plates, the ribs are better conditioned to withstand the deteriorating effects normally encountered in battery service. The ribs, although considerably denser at their high portions than the other portions of the separator, are still liquid permeable to a high degree, so that the separator has a substantially uniform porosity and wetability. The ribs permit flexing of the separator without breaking and yet provide the desired reinforcement and dimensional stability and prevent warping or folding. The separator has a more uniform gauge across the entire rib surface because the web material tends to hold its formed shape better during the final curing operation.

The lateral flow of resin from the high portions 12a of the ribs, during the rib-forming operation, causes some redistribution of the resin in the web. However, the relatively heavy pressure on the high portions 12a also causes a stretching and flow of fibers incident to the reduction of web thickness at these portions. Accordingly, although the material of the finished separator is considerably more compacted at the high portions 12a than at the flat areas 13a between the ribs, these high portions carry substantially the same proportion of resin (in relation to fibers) as the flat areas 13a.

I claim:

1. The method of making a liquid permeable battery separator, which comprises saturating a thin web of an air permeable paper base material with a thermosetting phenol-formaldehyde resin in the A-stage, heating the web along spaced elongated portions to a temperature below the setting temperature of the resin but in the range of 50°–80° C., shaping the web along said elongated portions to form ribs while the resin is at said temperature range and while displacing resin from the high portions of the ribs toward the base portions thereof under pressure to cause a flow of resin laterally of the ribs, and heating the web to set the resin.

2. The method according to claim 1, in which said first heating of the web and said shaping and displacing steps are performed simultaneously.

3. The method according to claim 1, in which said web is made from alpha-cellulose fibers which have been hydrated to allow stretching of the fibers during said shaping and displacing steps.

4. The method according to claim 1, in which the web has a volatile content of 12–15% at the time of said shaping step.

5. The method according to claim 1, in which said web is made from alpha-cellulose fibers which have been hydrated to allow stretching of the fibers during said shaping and displacing steps, the web having a volatile content of 12–15% at the time of said shaping step.

6. The method according to claim 1, in which the saturated web is made by forming alpha-cellulose fibers into a hydrated web, compressing the web to expel air and water from the spaces within and between the fibers, and immersing the compressed web in a solution of said A-stage resin to saturate the web and impregnate the fibers, wereby the internal and external surfaces of the fibers are protected with an acid resistant resin coating.

7. In the manufacture of a liquid permeable battery separator from alpha-cellulose fibers, the improvement which comprises forming the fibers into a hydrated web, compressing the web to expel air and water from the spaces within and between the fibers, immersing the compressed web in a solution of a phenol-formaldehyde resin in the A-stage to saturate the web and impregnate the fibers, whereby the internal and external surfaces of the fibers are protected with an acid resistant resin coating, partially drying the saturated web, forming the web under pressure into a separator having ribs while the resin is at a temperature range of 50°–80° C. and while displacing resin from the high portions of the ribs toward the base portions thereof under pressure to cause a flow of resin laterally of the ribs, and then heating the formed separator to polymerize the resin into its C-stage.

8. A liquid permeable battery separator comprising a thin paper base web which is air permeable, the web being formed along spaced elongated portions with integral ribs protruding from one face of the web, and a cured acid-resistant resin impregnating the web, the separator being characterized by the high portions of the ribs having a greater density and a smaller web thickness throughout than the areas of the separator intermediate the ribs, said high portions of the ribs carrying substantially the same proportion of resin to fibers as said intermediate areas.

9. A liquid permeable battery separator comprising a thin paper base web which is air permeable, the web being formed along spaced elongated portions with integral ribs protruding from one face of the web, and a thermosetting phenol-formaldehyde resin in the C-stage impregnating the web, the separator being characterized by the high portions of the ribs having a greater density and a smaller web thickness throughout than the areas of the separator intermediate the ribs, said high portions of the ribs carrying substantially the same proportion of resin to fiber as said intermediate areas.

10. A liquid permeable battery separator comprising a thin paper base web which is air permeable, the web being formed along spaced elongated portions with integral ribs protruding from one face of the web, and a thermosetting phenol-formaldehyde resin in the C-stage impregnating the web, the separator being characterized by the high portions of the ribs having a greater density and a smaller web thickness throughout than the base portions of the ribs and the areas of the separator intermediate the ribs, said high portions of the ribs carrying substantially the same proportion of resin to fibers as said intermediate areas.

References Cited in the file of this patent

UNITED STATES PATENTS

| | | |
|---|---|---|
| 1,257,903 | McKenna | Feb. 26, 1918 |
| 2,209,537 | Perry | July 30, 1940 |
| 2,543,137 | Uber | Feb. 27, 1951 |
| 2,662,032 | Uhlig et al. | Dec. 8, 1953 |
| 2,662,107 | Uhlig et al. | Dec. 8, 1953 |
| 2,668,574 | Segre | Feb. 9, 1954 |
| 2,687,445 | Merrill | Aug. 24, 1954 |

FOREIGN PATENTS

| | | |
|---|---|---|
| 740,438 | Great Britain | Nov. 9, 1955 |